United States Patent Office 3,505,417
Patented Apr. 7, 1970

3,505,417
DEHALOGENATION OF FLUOROHALOCARBONS
Lloyd E. Gardner, Bartlesville, Okla., assignor to Phillips Petroleum Company, a corporation of Delaware
No Drawing. Filed Oct. 5, 1966, Ser. No. 584,334
Int. Cl. C07c 21/18
U.S. Cl. 260—653.5                          8 Claims

ABSTRACT OF THE DISCLOSURE

Fluorohalocarbons are dehalogenated by contact in the presence of hydrogen with a catalyst composition containing aluminum fluoride and at least one metal selected from groups I through VIII of the periodic table, and metallic compounds thereof.

---

This invention relates to an improved process for the dehalogenation of fluorohalocarbons.

In another aspect, the invention relates to a process for dehalogenation of fluorohalocarbons by contacting them with an aluminum fluoride containing catalytic composition. In another aspect, the invention relates to the dehalogenation of fluorohalocarbons by contacting them with a catalytic composition containing aluminum fluoride and one or more metals or compounds thereof selected from group I to group VIII of the periodic table inclusive.

In another aspect, the invention relates to the removal of non-fluorine halogens from adjacent carbon atoms in a fluorohalocarbon by contacting the fluorohalocarbon with an aluminum fluoride containing catalytic composition.

In another aspect, the invention relates to the removal of one fluorine and one non-fluorine halogen from adjacent carbon atoms in a fluorohalocarbon which contains only one non-fluorine atom by contacting the fluorohalocarbon with an aluminum fluoride containing catalytic composition.

In a further aspect, the invention relates to the selective removal of one non-fluorine atom and one fluorine atom from adjacent carbon atoms in a fluorohalocarbon by contacting the fluorohalocarbon with a catalytic composition comprising (a) aluminum fluoride, (b) copper, (c) cobalt or chromium, and (d) an alkali or alkaline-earth metal or a mixture thereof.

Processes for the dehalogenation of fluorohalocarbon using a variety of supports and catalysts are well known. However, short catalyst life and deterioration of supports caused by the highly reactive compounds formed during the reaction and by deposition of polymeric material on the catalytic composition have reduced the effectiveness of the prior art processes. It is an object of this invention to provide an improved process employing a catalytic composition of long life that can readily be regenerated. Another object is to provide an improved process for the production of unsaturated, halogen containing precursors for polymers.

Other aspects, objects, and the several advantages of the invention will be apparent to one skilled in the art upon studying the disclosure and appended claims.

The practice of this invention provides a process for the dehalogenation of fluorohalocarbons (as used herein, the term fluorohalocarbons means saturated compounds containing only carbon, fluorine, and non-fluorine halogen) which comprises contacting the fluorohalocarbons with an aluminum fluoride-containing catalytic composition. Generally, the catalytic composition further contains at least one metallic element selected from groups I through VIII of the periodic table, and/or compounds or mixtures thereof of those elements. Other materials that do not adversely affect the activity of such catalytic compositions can also be contained therein. Some examples of these metals include: magnesium, barium, copper, sodium, potassium, chromium, nickel, molybdenum, vanadium, zinc, tin, silver, tungsten, iron, indium, titanium, germanium, platinum, palladium, rhodium, rhenium, osmium, iridium, and the like. Suitable compounds containing these metals include the halides, nitrates, nitrites, oxides, carbonates, oxyhalides, formates, acetates, oxalates, hydrides, nitrides, hydroxides, bicarbonates, sulfates, etc.

The process of this invention is generally applicable to fluorohalocarbons containing 2 to 8 carbon atoms or more. The non-fluorine halogen or halogens to be removed can be any of the halogens chlorine, bromine, and/or iodine. When only one atom of halogen other than fluorine is a part of the fluorohalocarbon, and when a fluorine is present on a carbon atom adjacent to a carbon bonded to a non-fluorine halogen, one fluorine and one non-fluorine halogen are removed from the adjacent carbon atoms to yield an olefinic bond. When non-fluorine halogens are present on adjacent carbon atoms, non-fluorine halogen is removed from both of the adjacent carbon atoms to yield an olefinic bond.

In another embodiment of this invention, however, when the catalytic composition used contains each of (a) aluminum fluoride, (b) copper, (c) cobalt or chromium, and (d) an alkali or alkaline-earth metal or mixtures thereof, one fluorine and one non-fluorine halogen atom can be removed from adjacent carbon atoms even when non-fluorine halogen is present on adjacent carbon atoms.

As the examples indicate, in all embodiments metallic catalyst systems of this invention that contain aluminum fluoride or fluorided alumina effect high levels of dehalogenation of fluorohalocarbons over a long catalyst life, and can be readily regenerated.

In general, the catalytic systems of this invention tend to remove non-fluorine halogen from adjacent carbon atoms in preference to fluorine halogen atoms. Thus, in one embodiment, when non-fluorine halogen atoms are present on adjacent carbon atoms, said non-fluorine halogens are removed in preference to fluorine. For example, when 1,2-dihalotetrafluoroethane is contacted with a catalyst of this invention in the presence of hydrogen, tetrafluoroethene is the resulting product of Equation I shows:

I

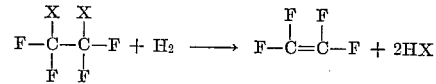

X=non-fluorine halogen

In other embodiments, when only one non-fluorine halogen atom is present in a fluorohalocarbon that contains two or more carbon atoms, or when all non-fluorine halogen atoms are bonded to only one carbon atom per molecule, one fluorine and one non-fluorine halogen are removed from the adjacent carbon atoms to form an unsaturated product. These two embodiments are represented in Equations II and III below, respectively:

II

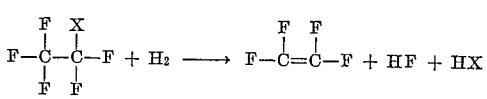

III

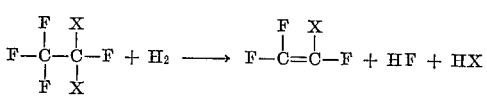

As mentioned above, when the catalytic composition used contains (a) aluminum fluoride, (b) copper, (c)

cobalt or chromium, and (d) an alkali or alkaline earth metal or mixtures thereof, one fluorine, and one non-fluorine halogen atom can be removed from adjacent carbon atoms of fluorohalocarbons even when non-fluorine halogen is present on adjacent carbon atoms. This is indicated by Equation IV below (and Example IV) which shows that, when the catalyst contains the above components, dehalogenation of 1,2-dichlorotetrafluoroethane results in the production of a substantial quantity of chlorotrifluoroethene. It should be understood that the copper, cobalt, and chromium elements can be present as the metal per se, and in other forms as well. Compounds of alkali and alkaline earth metals effective in the practice of this invention can include barium chloride, magnesium chloride, magnesium bromide, sodium chloride, potassium bromide, potassium iodide, etc.

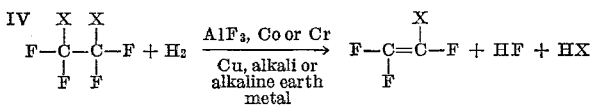

Among the fluorohalocarbons which can be dehalogenated in accordance with the practice of this invention are 1,1-dichlorotetrafluoroethane, 1,2-dichlorotetrafluoroethane, 1,1 - dichloro-2-bromo-trifluoroethane, 1-chloroheptadecafluorooctane, 1 - bromo - 2 - iodo-6-chloropentadecafluorooctane, 1 - bromotetrafluoroethane, 1-chloro-4 - chloro - 4-iodooctafluorobutane, 1-bromo-2-chloro-3-iodo - 5-(trifluoromethyl)tetradecafluorooctane, 1,1,2-tribromo-2,2-dichlorofluoroethane, and the like.

Substantially pure fluorohalocarbons can be employed if substantially pure products are desired, or mixed fluorohalocarbons can be employed if mixtures are suitable as products.

The dehalogenation reaction of this invention can be implemented in suitable equipment known to the art by any suitable reaction technique. For example, the catalytic composition can be placed as a column in an enclosure of substantially inert material and a mixed stream of fluorohalocarbon and hydrogen can be passed through. For the lighter fluorohalocarbons, a vapor phase reaction is preferred though liquid systems can also be used. Reaction temperatures should generally be between 100 and 900° C., though temperatures between 200 and 600° C. are usually preferred because of convenience. Similarly, though pressure between 0.5 atmosphere and 10 atmospheres or more can be employed, usually atmospheric pressure is preferred. Reaction time will vary with temperature, reaction mixture, composition, and other variables; thus a reaction time, temperature, etc., for each set of conditions can be selected to give the greatest efficiency. Unconsumed reactants can be recycled if desired, and the products can be purified by distillation or other suitable technique.

In the embodiment described, a ratio of at least 2 moles of hydrogen per mole of fluorohalocarbon is normally preferred in order to influence the equilibrium of the reactions, as represented by the chemical equations above, in favor of the unsaturated products. However, mole ratios between 0.5 and 15 moles of hydrogen or more per mole of fluorohalocarbon can be used. In addition, the hydrogen (or optionally, a hydrogen yielidng compound)-fluorohalocarbon feed can be diluted with certain other compounds. Such compounds are: helium, neon, other inert gases, or any other material or combination thereof that does not deleteriously affect the process of the invention.

The aluminum fluoride containing catalytic composition of the invention can be prepared in any suitable manner. For example, alumina or compositions containing alumina can be contacted with vaporous hydrogen fluoride at elevated temperatures in the presence or absence of gaseous diluent that is substantially inert to such conditions. In another embodiment, alumina-containing compositions can be impregnated with a solution of a fluorine compound such as ammonium fluoride, ammonium bifluoride, or hydrogen fluoride, and subsequently heated in a nonreactive atmosphere.

In general, catalytic compositions of the invention should contain sufficient aluminum fluoride to promote long catalyst life. Specifically, catalytic compositions containing more than about 1 part of aluminum fluoride by weight in 50 parts of catalytic composition by weight can be used. Any suitable aluminum or alumina-containing compound such as α-alumina, γ-alumina, and the like or materials containing alumina such as molecular sieves, bauxite, and the like can be fluorided and employed as a component to produce suitable catalyst. Further, aluminum fluoride is readily available and can be employed as such as a component to make suitable catalysts. In addition, fluorided alumina compounds containing non-aluminum metal fluoride catalysts can readily be prepared by incorporating suitable metallic compounds in the alumina-containing composition and effecting subsequent fluoridation of the composite by methods such as those described above.

The other metallic catalyst components of the invention can be integrated with the aluminum fluoride containing composition by well-known methods such as mixing salts, oxides, or other metal containing compositions with the aluminum fluoride containing composition, or by impregnating the aluminum fluoride containing composition with solutions containing the other metallic components. Such aluminum fluoride compositions that contain other metallic components can be heated in an atmosphere that contains oxygen to convert any or all of the metallic components other than aluminum to the oxide form if desired. Resulting compositions can then be treated with an atmosphere that contains hydrogen at an elevated temperature to activate the catalyst system if desired. Other methods for preparing the catalytic compositions of this invention are well known to those skilled in the art.

Though the amount and kind of non-aluminum metallic catalytic components to be employed for optimum conversion will depend upon variables such as feed composition, pressure, temperature, reaction time, and equipment design, the aluminum fluoride-containing composition can contain from about 0.05 to about 30 weight percent of the non-aluminum metals based on the weight of aluminum fluoride. In particular, when the catalyst contains aluminum fluoride, copper, chromium or cobalt, and one or more alkali or alkaline-earth metals, or compounds of such non-aluminum metals, from about 0.03 to about 10 percent by weight of copper, from about 0.03 to about 10 percent by weight of chromium or cobalt, and from about 0.03 to about 10 percent by weight of the alkali or alkaline-earth metals based on the weight of the aluminum fluoride are preferred as concentrations of these elements.

As mentioned above, the aluminum fluoride containing catalytic compositions can be readily regenerated. A suitable method of regeneration comprises passing an oxygen containing gas such as air over the catalytic composition while maintaining same at a sufficiently elevated temperature until substantially all carbon containing compounds thereon are oxidized. Subsequent activation of the catalyst can be accomplished by passing hydrogen over it if desired.

EXAMPLE I

Aluminum fluoride containing compositions were impregnated with 5% non-aluminum metallic catalytic components (weight of each metal (100)/wt. of aluminum fluoride containing composition) by soaking the aluminum fluoride containing composition in an aqueous solution of the respective metal salts, draining, and drying under a heat lamp. As an example, the catalyst of Run I was prepared by soaking 100 g. of technical aluminum fluoride in 200 ml. of aqueous solution containing 86.7 g. of $CuNO_3 \cdot 3H_2O$ and 43.7 g. of chromic acid, draining, and drying the solids under a heat lamp. Proportional amounts of the salts of other metals were used by this technique to produce other aluminum fluoride containing catalytic compositions hereafter described that contain 5% of each non-aluminum catalytic metal. After drying, the impregnated compositions were heated for 4 hours at 1000° F. in a muffle furnace. After this step the catalysts were ready to use.

Each catalytic composition (100 cc.) was then packed into a Monel tube reactor 1 inch in diameter and 1 foot long. The reactor was situated in a thermostatted heater, and feed gas flowed into the reactor through a preheat tube passing through the heater; the preheat tube was ¼ inch in diameter and 10 inches long. Feed gas of halogenated material and $H_2$ was passed through the reactor; products passed to a water scrubber to remove HCl and HF, a dryer, an onstream sampling gas-liquid chromatograph, and a condenser. The following table summarizes data from several runs. 1,2-dichlorotetrafluoroethane was used as the fluorohalocarbon feed component.

TABLE I

| Catalytic Composition | Run 1 | Run 2 | Run 3 | Run 4 | Run 5 | Run 6 |
|---|---|---|---|---|---|---|
|  | [CuO·$Cr_2O_3$ AlF$_3$] | CuO·$Cr_2O_3$ Zeolon H (⁵) | [RhCl$_3$ AlF$_3$] | RhCl$_3$ α Al$_2$O$_3$ (⁶) | [Pt Al$_3$F] | Pt α Al$_2$O$_3$ |
| Temp., ° F | 750 | 755 | 760 | 750 | 850 | 830 |
| Rate, v./v./hr.¹ | 60 | 60 | 120 | 60 | 120 | 60 |
| $H_2$ conc., mole percent ² | 50 | 50 | 87 | 50 | 87 | 50 |
| Percent conversion ³ | 31 | 18 | 75 | 20 | 70 | 28 |
| Percent Yield of TFE ⁴ | 61 | 43 | 59 | 40 | 68 | 52 |

¹ Rate=vol. of gas/vol. of catalytic composition/hr. at STP.
² $H_2$ concentration=moles $H_2$ (100)/moles $H_2$+moles $CClF_2$-$C_4F_2$.
³ Percent conversion=moles $CF_2ClCF_2Cl$ feed minus moles $CF_2ClCF_2Cl$ not reacted (100)/moles of $CF_2ClCF_2Cl$ feed.
⁴ Yield of TFE=moles $CF_2$=$CF_2$ (100)/moles $CF_2ClCF_2Cl$.
⁵ Zeolon H—a trademark for a Norton Co. molecular seive product.
⁶ α $Al_2O_3$=a low surface area alpha alumina.
Comments:
Run 2.—Si$F_4$, $CO_2$, and $CO_2$ produced.
Run 4.—Polymerization on the catalyst.
Run 6.—Excessive deposit on catalyst and production of CO and $CO_2$.

This example demonstrates that higher conversions and yields are obtained with aluminum-fluoride containing catalytic compositions than with non-aluminum fluoride containing catalytic compositions regardless of what other catalytic components are present. Stability of catalytic compositions and freedom from buildup of polymeric material on these compositions are also demonstrated.

EXAMPLE II

Aluminum-fluoride containing catalytic compositions of copper oxide-cobalt oxide were made up and run according to the method of Example I except that the catalytic compositions contained 1% Co and 5% Cu rather 5% of each metal.

| Catalytic composition | Run 1 | Run 2 |
|---|---|---|
|  | CuO-CoO, fluorided Al$_2$O$_3$ ¹ | CuO-CoO, Zeolon Na ² |
| Temp., ° F | 860 | 875 |
| Rate, v./v./hr | 120 | 60 |
| $H_2$ conc., mole percent | 87 | 50 |
| Percent Conversion | 95 |  |
| Percent Yield of TFE | 78 |  |

¹ Al$_2$O$_3$ was treated with HF.
² A trademark for a Norton Co. molecular sieve product.

Comments: Run 2—Impossible to get adequate conversion and yield data due to excessive production of CO, $CO_2$, and deterioration of catalytic compositions.

This example demonstrates the superiority of a fluorided alumina containing catalytic composition over an Al$_2$O$_3$ containing catalytic composition.

EXAMPLE III

An aluminum fluoride containing catalytic composition of copper oxide, chromium oxide and fluorided Al$_2$O$_3$ which contained 5% Cu and 5% Cr was prepared according to the method of Example I. This catalytic composition (100 cc. total) was placed in the equipment of Example I. 1,2-dichlorotetrafluoroethane and $H_2$ were used as feed under the conditions stated in Table II. Regeneration was accomplished by passing air over the catalytic composition preheated to 850° F. at such a rate that the temperature did not rise over 1050° F. nor fall below 850° F. until substantially all polymeric materials were oxidized. The catalytic composition was then activated by passing $H_2$ over it for two hours before being put back into service. The following Table II summarizes the results of a series of regeneration runs.

TABLE II

Effect of Regeneration on Conversion of $CClF_2CClF_2$ with $H_2$ in the Presence of a CuO-$Cr_2O_3$-Fluorided Al$_2$O$_3$ Catalytic Composition

| Hours on Stream | Conditions ||| Percent Conversion |
|---|---|---|---|---|
|  | Temp., ° F. | Ratio $H_2$/F114 (a) | Flow Rate, v./v./hr. |  |
| 5 | 850 | 7.0 | 120 | 47 |
| 7 | 850 | 7.0 | 120 | 44 |
| 9 | 850 | 7.0 | 120 | 31 |
| 10 | 850 | 7.0 | 120 | 16 |
| Regeneration |||||
| 11 | 850 | 7.0 | 120 | 83 |
| 12 | 850 | 7.0 | 120 | 62 |
| 14 | 850 | 7.0 | 120 | 26 |
| Regeneration |||||
| 15 | 850 | 7.0 | 120 | 95 |
| 16 | 850 | 7.0 | 120 | 84 |
| 18 | 850 | 7.0 | 120 | 50 |
| 21 | 850 | 7.0 | 120 | 31 |
| Regeneration |||||
| 22 | 850 | 7.0 | 120 | 93 |
| 24 | 850 | 7.0 | 120 | 50 |
| 26 | 850 | 7.0 | 120 | 44 |
| Regeneration |||||
| 27 | 750 | 7.0 | 120 | 79 |
| 28 | 750 | 7.0 | 120 | 70 |
| 30 | 750 | 7.0 | 120 | 39 |
| Regeneration |||||
| 31 | 950 | 7.0 | 120 | 100 |
| 34 | 950 | 7.0 | 120 | 81 |
| Regeneration |||||
| 35 | 900 | 7.0 | 120 | 100 |
| 36 | 900 | 7.0 | 120 | 93 |
| 38 | 900 | 7.0 | 120 | 56 |
| Regeneration |||||
| 39 | 850 | 3.0 | 240 | 89 |
| 41 | 850 | 3.0 | 240 | 57 |
| 43 | 900 | 3.0 | 240 | 61 |
| 46 | 900 | 3.0 | 240 | 34 | a F114 is a designation for $CClF_2CClF_2$.

These data show that a fluorided alumina catalytic system can be successively regenerated over a considerable number of cycles without loss of activity, and that a variety of reaction temperatures, feed rates, and ratios of H₂ to 1,2-dichlorotetrafluoroethane can be successfully employed in the practice of this invention.

EXAMPLE IV

Aluminum fluoride containing catalytic compositions are impregnated with non-aluminum catalytic metallic components in such manner that 5% by weight of each metal based on the weight of aluminum fluoride was impregnated; such impregnation was effected by soaking the AlF₃ in an aqueous solution of the metal salts, draining, and drying under a heat lamp. As an example, the catalytic composition of Run 2 was prepared by soaking 100 g. of technical AlF₃ in 200 ml. of aqueous solution containing 86.7 g. of CuNO₃·3H₂O and 43.7 g. of chromic acid, draining, and drying the solids under a heat lamp. Proportional amounts of the salts of other non-aluminum metals were used in accordance with this technique to produce the other aluminum fluoride containing catalytic compositions that contained 5% of each metal other than aluminum. After drying, the impregnated compositions were heated for 4 hours at 1000° F. in a muffle furnace. The catalytic composition of Run 1 only was at this point treated with 40.4 g. of BaCl₂·2H₂O in 200 ml. of water, drained, and the solids dried so as to add 5% BaCl₂ to the catalytic composition (weight Ba(100)/wt. AlF₃). After this step the catalytic compositions were ready to use.

Each catalytic composition (100 cc.) was then packed into a Monel tube reactor 1 inch in diameter and 1 foot long. The reactor was situated in a thermostatted heater, and feed gas flowed into the reactor through a preheat tube that passed through the heater; the preheat tube was ¼ inch in diameter and 10 inches long. Feed gas was passed through the reactor; products were passed to a water scrubber to remove HCl and HF, then to a dryer, an on-stream sampling gas-liquid chromatograph, and a condenser. Atmospheric pressure was employed. The following table summarizes data. Feed gas was 1,2-dichlorotetrafluoroethane and hydrogen.

|  | Run 1 | Run 2 | Run 3 |
| --- | --- | --- | --- |
| Catalytic Composition | CuO, Cr₂O₃, BaCl₂, AlF₃ | CuO, Cr₂O₃, AlF₃ | CuO, CoO, AlF₃ |
| Temp., °F | 850 | 850 | 850 |
| Rate, v./v./hr.¹ | 120 | 120 | 120 |
| H₂ conc., mole percent² | 87 | 87 | 87 |
| Percent: |  |  |  |
| Conversion³ | 65 | 47 | 52 |
| Yield CTFE⁴ | 20 | 3 | 3 |
| Yield CHF₂CClF₂ | 14 | 10 | 32 |
| Yield of TFE⁵ | 62 | 73 | 53 |

¹ Rate = vol. of gas vol. of catalyst/hr. at STP.
² H₂ concentration = moles H₂ (100)/(moles H₂ + moles CF₂ClCF₂Cl).
³ Percent conversion = moles CF₂ClCF₂Cl feed minus moles CF₂ClCF₂Cl not reacted (100)/moles of CF₂ClCF₂Cl feed (as determined at 5th hour of each run).
⁴ Percent yield of CTFE = moles CClF=CF₂ (100)/moles CFC₂lCF₂Cl reacted (as determined at 5th hour of each run).
⁵ Percent yield of TFE = moles CF₂=CF₂ (100)/moles CF₂ClCF₂Cl reacted (as determined at 5th hour of each run).

This example demonstrates that chlorotrifluoroethene is produced in the presence of the catalytic compositions of this invention by contacting 1,2-dichlorotetrafluoroethane and hydrogen with the catalytic composition. The production of tetrafluoroethene, a valuable product, is also demonstrated. Further, this example demonstrates the production of substantial amounts of chlorotrifluoroethene in the presence of a catalytic composition consisting of aluminum fluoride, copper, chromium (or cobalt), and an alkaline earth metal as disclosed above with reference to Equation IV.

This example further demonstrates that an intermediate compound, chloro-1,1,2,2-tetrafluoroethane, is formed in the reaction. This compound can be recycled to form more TFE, used as an intermediate, or separated and used as a refrigerant. The data in Run 3 show that the presence of cobalt in the catalyst increases the yield of CHF₂CClF₂.

EXAMPLE V

Using the reactor set-up of Example I, aluminum fluoride of the type used in Example I, the following runs were made:

|  | Run 1 | Run 2 |
| --- | --- | --- |
| Catalytic composition | AlF₃ | AlF₃ |
| Temp., °F | 850 | 900 |
| Rate, v./v./hr.¹ | 120 | 120 |
| Mole ratio, H₂/1,2-dichlorotetrafluoroethane | 7.0 | 7.0 |
| Percent conversion³ | 5.0 | 5.0 |
| Yield of TFE⁵ | 2.6 | 2.6 |

See footnotes at end of preceding table.

Thus, AlF₃ alone is essentially inactive for the reaction, but, as Example I shows, its presence in a catalytic composition provides dramatic increases in conversion and yield.

Reasonable variation and modification are possible in the spirit and scope of the invention, the essence of which is a process for the dehalogenation of fluorohalocarbons comprising contacting them with an aluminum fluoride-containing catalytic composition.

I claim:
1. A process for the dehalogenation of at least one fluorohalocarbon having from 2–8 carbon atoms per molecule, inclusive, wherein at least one halogen removed from said fluorohalocarbon by said dehalogenation is chlorine, bromine, or iodine to form an olefinic bond comprising contacting said fluorohalocarbon at a temperature in the range 200–600° C. in the presence of 0.5–15 moles of hydrogen per mole of fluorohalocarbon with a catalytic composition consisting essentially of aluminum fluoride and from 0.05–30 weight percent of at least one of CuO, Cr₂O₃, RhCl₃, CoO and Pt.

2. A process for the dehalogenation of at least one fluorohalocarbon having from 2–8 carbon atoms per molecule, inclusive wherein at least one halogen removed from said fluorohalocarbon by said dehalogenation is chlorine, bromine, or iodine to form an olefinic bond comprising contacting said fluorohalocarbon at a temperature in the range of 200–600° C. in the presence of 0.5–15 moles of hydrogen per mole of fluorohalocarbon with a catalytic composition consisting essentially of aluminum fluoride and 0.05–30 weight percent of
(a) copper oxide (CuO), and at least one of
(b) chromium oxide or cobalt oxide, and
(c) an alkali metal or alkaline earth metal, and compounds thereof.

3. A process as defined in claim 1 wherein said fluorohalocarbon has from 2 to 8 carbon atoms per molecule, inclusive, and contains at leats one non-fluorine halogen bonded to each of two adjacent carbon atoms whereby said contacting removes one of said non-fluorine halogens from each of said adjacent carbon atoms on at least one of said fluorohalocarbons present.

4. A process as defined in claim 1 wherein said fluorohalocarbon has from 2 to 8 carbon atoms per molecule, inclusive, and contains at least one non-fluorine halogen bonded to only one carbon atom whereby said contacting removes from at least one of said fluorohalocarbons present one non-fluorine halogen and one fluorine from the carbon atom adjacent to said carbon atom containing at least one non-fluorine halogen.

5. A process as defined in claim 2 wherein (a) is CuO, (b) is Cr₂O₃ and (c) is BaCl₂.

6. A process as defined in claim 2 wherein said fluorohalocarbon has from 2 to 8 carbon atoms per molecule, inclusive, and contains at least one non-fluorine halogen bonded to each of two adjacent carbon atoms, whereby said contacting removes from at least one fluorohalocarbon present, only one of said non-fluorine halogens and one fluorine from the carbon atoms adjacent to said carbon atoms containing at least one-non-fluorine halogen.

7. A process as defined in claim 2 wherein said fluorohalocarbon is 1,2-dichloro-tetrafluoroethane whereby said contacting produces a mixture comprising chlorotrifluoroethene, tetrafluoroethene, and chloro-1,1,2,2-tetrafluoroethane.

8. A process as defined in claim 1 wherein said fluorohalocarbon is 1,2-dichloro-tetrafluoroethane, and said substance is CuO and CoO whereby said contacting produces a mixture comprising chlorotrifluoroethene, tetrafluoroethene, and chloro-1,1,2,2-tetrafluoroethane.

References Cited

UNITED STATES PATENTS

| | | | |
|---|---|---|---|
| 2,478,933 | 8/1949 | Bratton et al. | 260—653.5 |
| 2,697,124 | 12/1954 | Mantell | 260—653.5 |
| 2,704,775 | 3/1955 | Clark | 260—653.5 |
| 2,704,777 | 3/1955 | Clark | 260—653.5 |
| 2,709,688 | 5/1955 | Bandes et al. | 260—653.5 |
| 2,900,423 | 8/1959 | Smith | 260—653.5 |

DANIEL D. HORWITZ, Primary Examiner

U.S. Cl. X.R.

252—429, 438, 440, 442